Patented May 23, 1933

1,911,053

UNITED STATES PATENT OFFICE

GERALD R. BROPHY, OF SCHENECTADY, NEW YORK, ASSIGNOR TO GENERAL ELECTRIC COMPANY, A CORPORATION OF NEW YORK

WELD ROD

No Drawing. Application filed November 13, 1929. Serial No. 407,015.

My invention relates to fusion welding and more particularly to weld rods used in fusion welding.

In fusion welding a joint is made by raising the adjacent portions of the parts to be welded to their fusion temperatures at which portions of the metal of each part flow together and mingle and the fused metal is then allowed to cool forming a cast joint. Generally, additional material is added during the fusion operation and such additional metal is fed into the zone of fusion from a weld rod, a portion of which is subjected to the influence of the heating agency. Fusion welding may be performed either through the agency of a gas flame or an electric arc. When an electric arc is used the weld rod may form the electrode used for sustaining the arc employed in making the joint in which case the weld rod is referred to as an electrode.

Many attempts have been made in the past to improve the quality of the weld metal. Various fluxes have been used. Generally these fluxes have been used in order to protect the weld metal from the detrimental effects of the oxygen and nitrogen of the surrounding atmosphere. In arc welding, however, fluxes have been used not only for their effect on the weld metal but also because of their effect on the action of the arc.

It is possible to determine whether the weld metal is normal or abnormal by examining it by the well known McQuaid-Ehn test. Abnormal metal when carburized and then examined under the microscope shows carbide in massive particles and unassociated with ferrite. Welds made by the usual methods using mild steel electrodes have this abnormal structure and when such metal is annealed above its critical range it will still show large columnar grains which is typical of brittle metal. Metal having normal characteristics when annealed above its critical range will show an equiaxed structure which is typical of ductile metal.

An object of my invention is to provide an improved self fluxing weld rod by means of which it is possible to deposit metal having normal characteristics.

A further object of my invention is to provide a particular method of welding with a rod such as my improved weld rod when used as an electrode.

My invention will be better understood and further objects will become apparent from a consideration of the following description and its scope will be pointed out in the appended claims.

According to my invention I use an iron alloy containing less than .05% carbon and manganese from 2 to 4% in forming a weld rod for use in welding operations. The manganese content is preferably about 4%. An appreciable amount but less than 1% of metal of the group constituted by the elements silicon and titanium may be alloyed with the iron and manganese in order further to improve the quality of the metal deposited from the weld rod. When silicon alone is used with manganese I have obtained the best results with a silicon content of about .75%. When titanium is used alone with manganese a smaller amount is required than when silicon is used alone.

Heretofore alloy rods containing manganese and carbon have been used but not in the particular proportions which I have found to give the most satisfactory results. Preferably, a weld rod according to my invention should contain no carbon but if the percentage of carbon in the electrode is limited to less than .05% the resulting deposit is found to have suitable characteristics.

A weld rod according to my invention when used as an electrode improves the operating characteristics of the arc. With my electrode it is possible to obtain a steady, quiet arc giving deep penetration and operating at a voltage as high as 30 volts for an arc of the usual length, which normally operates with usual electrodes at voltages between 17 to 20 volts. There is no dripping or spattering of weld metal when using my improved electrode and consequently high electrode efficiencies and neat appearing welds are obtained. The composition of my weld rod also insures the deposition of a normal steel the nature of which has been pointed out above. The manganese, silicon and/or titanium if used, prevents oxidation and a deposit having better strength, ductility and freedom from porosity is obtained. The metal deposited is highly fluid and quiet, by reason of which the soundness of the deposit is increased. The general appearance of the bead is very pleasing. The surface is smooth, free from imperfections and requires practically no finishing on a welded structure. When silicon or titanium is used it is possible to decrease the amount of manganese used. With the addition of silicon or titanium the solidity and appearance of the bead is further improved. The silicon and titanium also form with the manganese present upon oxidation and combination a thin slag which covers the metal and keeps it molten for a longer period of time than is the case in most welding operations, thereby preventing oxidation of the weld and allowing occluded gases to escape from the deposited metal. Titanium will combine with any nitrogen present removing it or fixing it in a harmless condition.

Manganese is used in order to secure a dense weld and to eliminate the occlusion of gas in the deposited metal. A certain amount of manganese is carried over into the metal of the weld and its presence there insures that the weld metal is degasified. Preferably no carbon should be present in the weld but amounts less than .05% are not injurious. This is necessary to insure that the welds shall have maximum ductility. Especially is this true in view of the fact that a certain amount of the manganese of the weld rod will generally be deposited in the weld by reason of using a sufficient quantity in the rod to guarantee ample protection of the weld metal during the welding operation.

When a weld rod according to my invention is used as an electrode it is preferable to make it a positive electrode in order to get a proper transfer of metal. According to the usual practice the electrode is made negative since it has been found desirable to have the positive crater of the arc, where most of the heat is developed, in the work part itself because as a rule the work is more massive and requires more heat. In the usual weld rod there is occluded in the rod a certain amount of gas which in the arc expands with explosive force and helps transfer the metal of the electrode to the work being welded. A weld rod according to my invention, however, is particularly free from occluded gas and it is preferable to make it a positive electrode in order to insure that part of it is rapidly vaporized causing explosions similar to those produced by occluded gases in other weld rods for transferring the electrode metal to the work being welded. When welding with alternating current the polarity alternately changes from plus to minus. Sufficient heat, however, will be generated in a gas free rod, such as I have described above, in order to vaporize the metal and secure a proper transfer of molten metal from the rod to the part or parts being welded when using alternating current.

When using my weld rod best results are obtained when the parent metal has a carbon content which is low, preferably below about .10%. If the carbon content of the parent metal is appreciably higher than this the ductility of the weld metal will be reduced especially at the zone of fusion between the parent metal and the weld metal where the carbon of the parent metal tends to migrate to the weld metal building up its carbon content.

Preferably my weld rod is used as an electrode or filler rod in arc welding operations. It may be used, however, as pointed out above, in gas welding operations and when used with an actively reducing welding flame the amount of manganese and silicon used in the rod may be decreased.

My weld rod may be given any desired shape. It may be made round, square, hollow, or may be cut into flat strips from sheet material. Additional material may be associated with the rod without departing from my invention.

What I claim as new and desire to secure by Letters Patent of the United States, is:

1. A weld rod comprising an iron alloy containing carbon less than .05% and manganese from 2 to 4%.

2. A weld rod comprising an iron alloy containing less than .05% carbon and about 4% manganese.

3. A weld rod comprising an iron alloy containing less than .05% carbon, 2 to 5% manganese and an appreciable amount but less than 1% of metal of the group constituted by the elements silicon and titanium.

4. A weld rod comprising an iron alloy containing carbon less than .05%, manganese about 4% and silicon about .75%.

5. A weld rod comprising an iron alloy containing carbon less than .05%, manganese about 4% and an appreciable amount but less than 1% of titanium.

In witness whereof, I have hereto set my hand this 12th day of November, 1929.

GERALD R. BROPHY.